C. F. M. VAN BERKEL.
SLICE COLLECTOR FOR SLICING MACHINES.
APPLICATION FILED SEPT. 29, 1917.
1,286,453.
Patented Dec. 3, 1918.
5 SHEETS—SHEET 1.
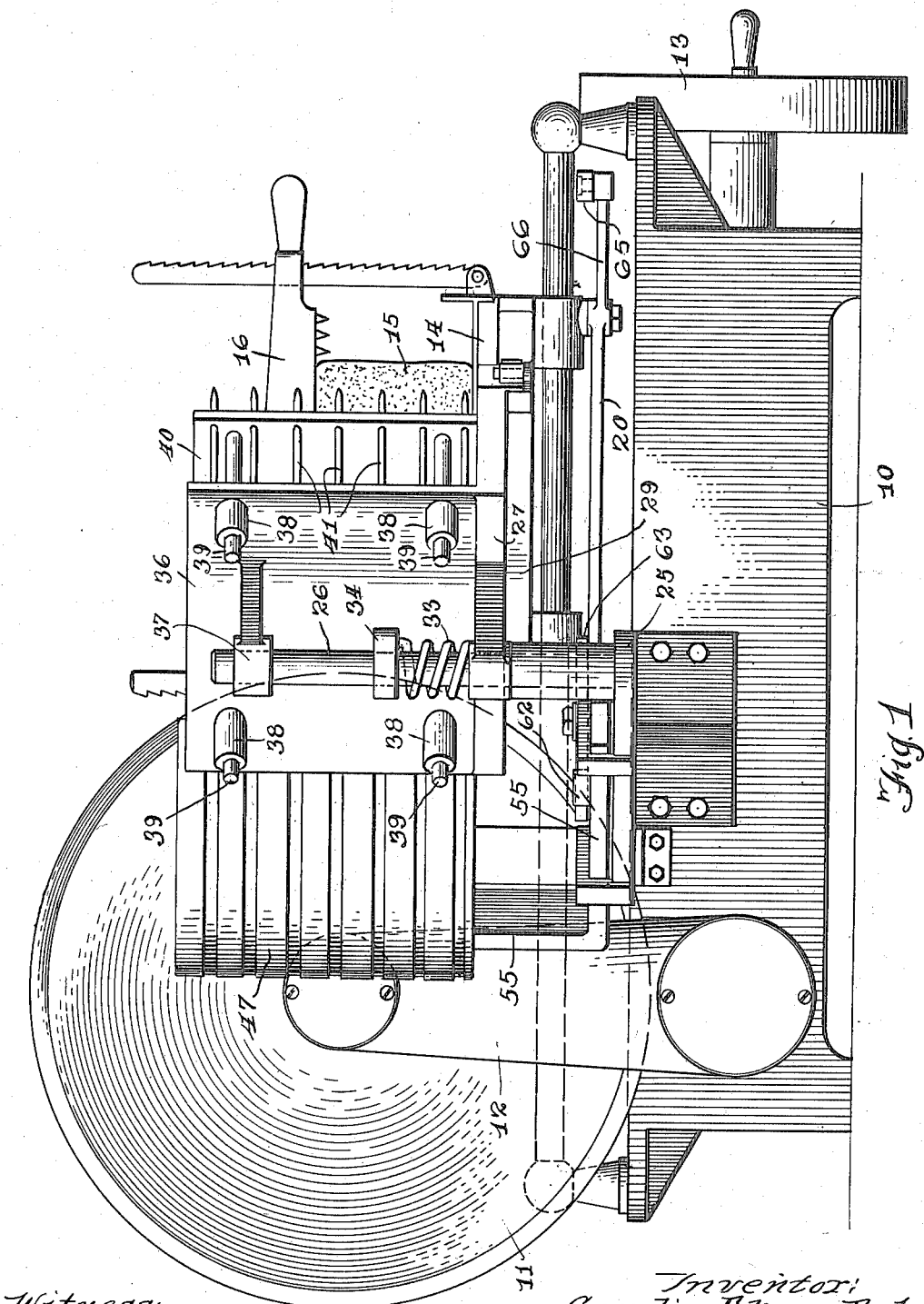
Witness:
L B Graham
Inventor:
Cornelis F. M. van Berkel
By
His Att'ys.

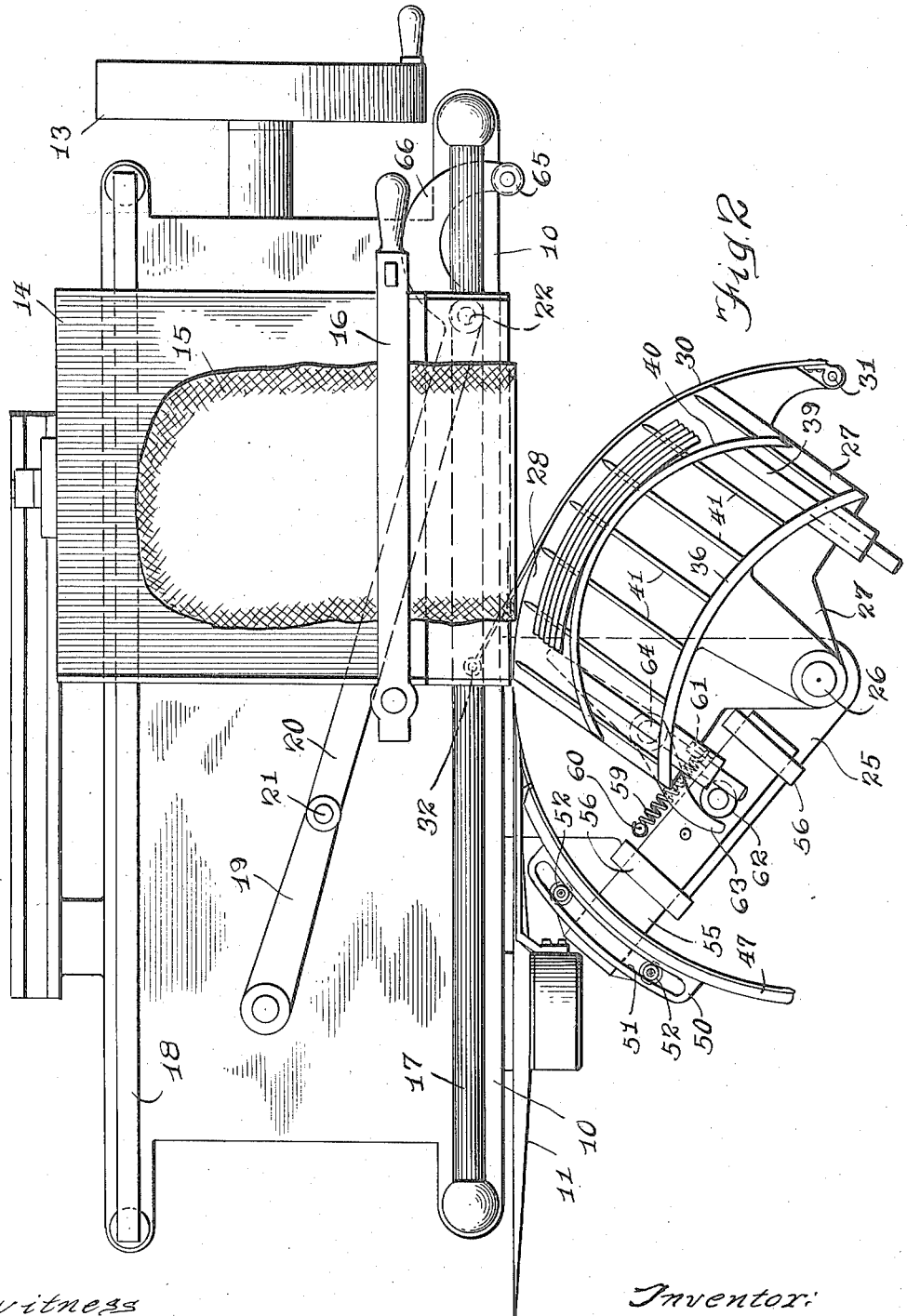

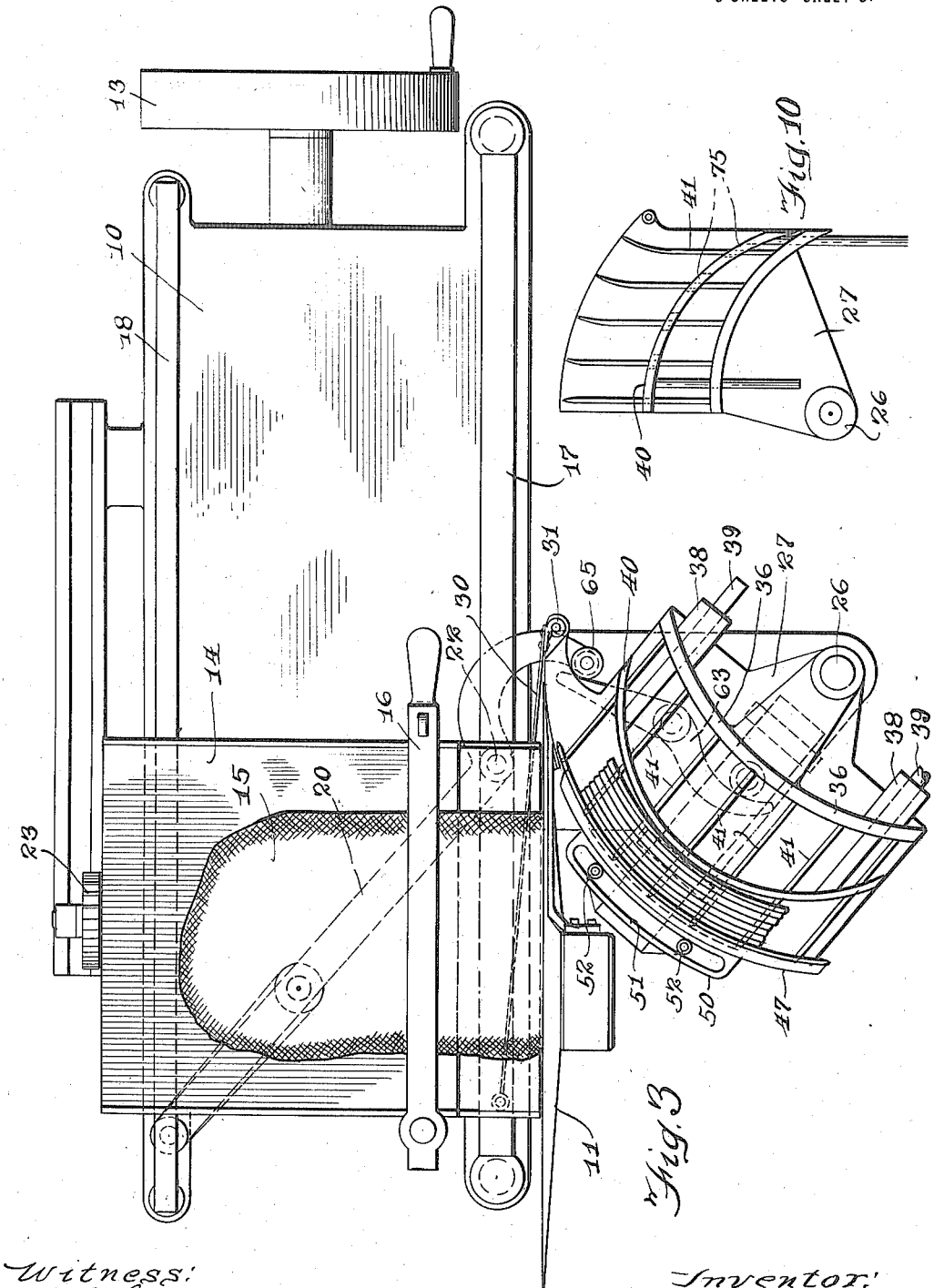

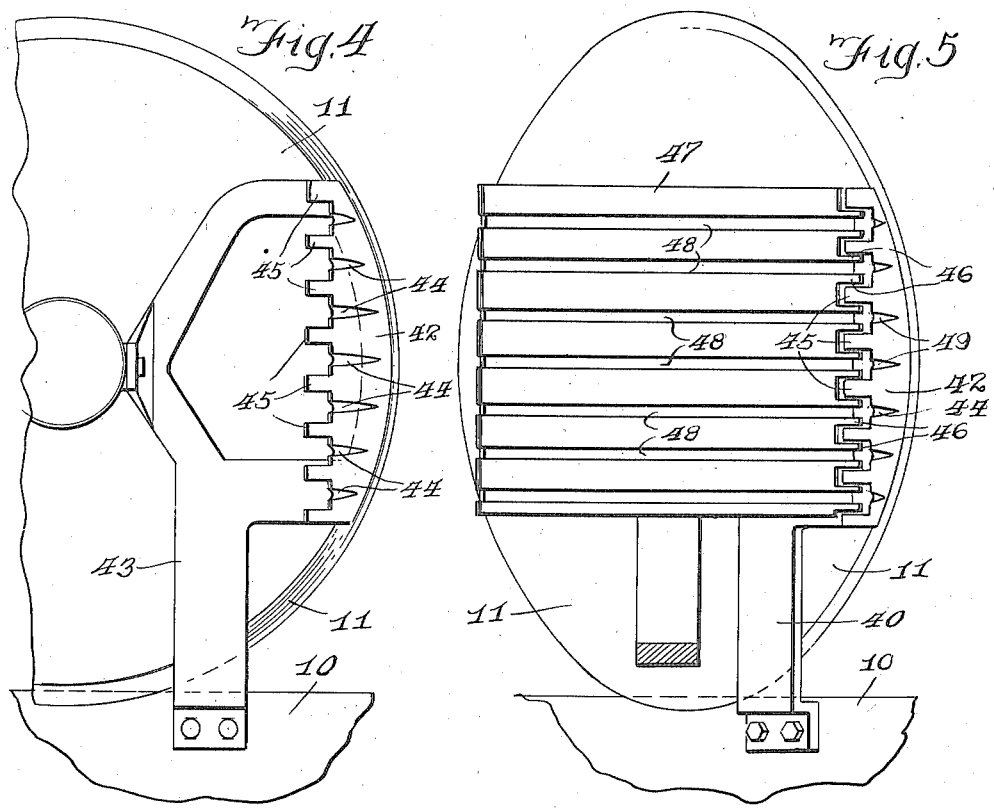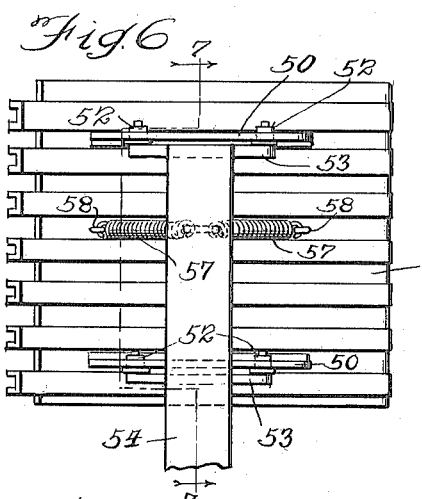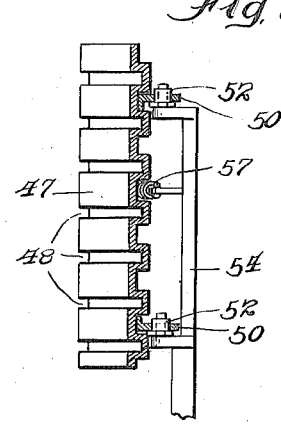

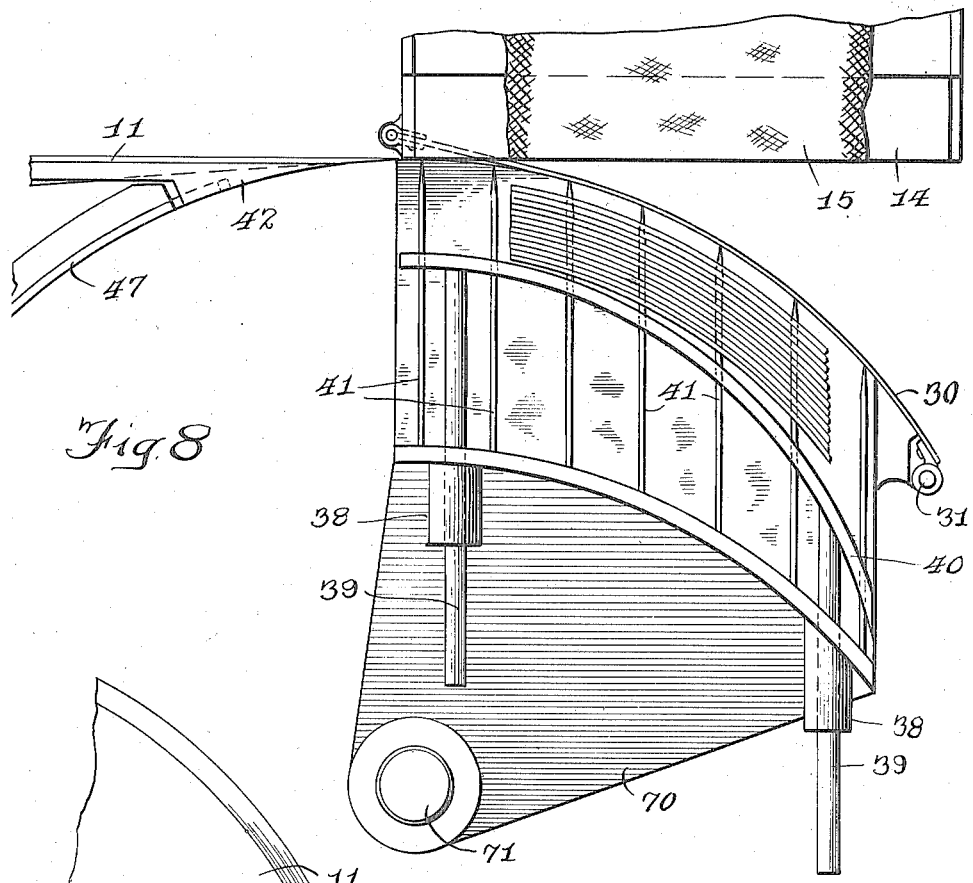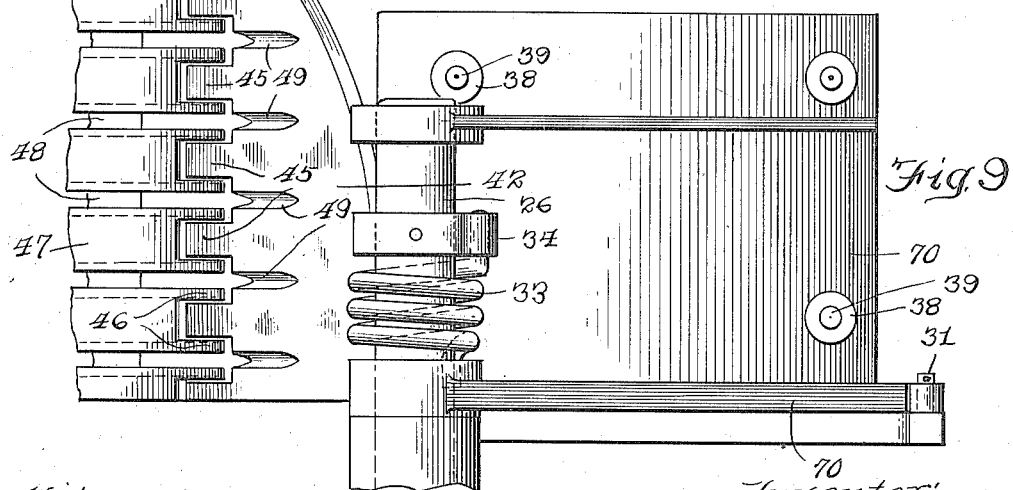

UNITED STATES PATENT OFFICE.

CORNELIS F. M. VAN BERKEL, OF LAPORTE, INDIANA, ASSIGNOR TO U. S. SLICING MACHINE COMPANY, OF LAPORTE, INDIANA, A CORPORATION OF INDIANA.

SLICE-COLLECTOR FOR SLICING-MACHINES.

1,286,453.          Specification of Letters Patent.          Patented Dec. 3, 1918.

Application filed September 29, 1917. Serial No. 193,863.

*To all whom it may concern:*

Be it known that I, CORNELIS F. M. VAN BERKEL, a subject of the Queen of The Netherlands, and residing at Laporte, in the county af Laporte and State of Indiana, have invented certain new and useful Improvements in Slice-Collectors for Slicing-Machines, of which the following is a specification.

This invention has for its object the provision of a device of the class named which shall be of improved construction and more efficient, convenient and economical in operation than similar devices previously known. The invention is exemplified in the combination and arrangement of parts shown in the accompanying drawings and described in the following specification, and it is more particularly pointed out in the appended claims.

In the drawings—

Figure 1 is a side elevation of a slicing machine to which one embodiment of the present invention is applied.

Fig. 2 is a top plan view of the mechanism shown in Fig. 1.

Fig. 3 is a view similar to Fig. 2 but showing the parts in a different position.

Fig. 4 is a fragmentary side elevation of a special form of guard for the slicing knife forming a part of the present invention.

Fig. 5 is a fragmentary elevational view of a portion of the slicing machine looking toward the concave side of the slice guard forming a part of the present invention.

Fig. 6 is a rear view of the slicing guard shown in Fig. 5.

Fig. 7 is a vertical sectional view on line 7—7 of Fig. 6.

Fig. 8 is a top plan view showing a modified form of the present invention.

Fig. 9 is an elevation of the device shown in Fig. 8; and

Fig. 10 shows a slightly modified form of collector tines.

This invention may be applied to any well known and approved form of slicing machine, such as that shown in the drawing, in which the numeral 10 designates the base or supporting frame which carries the usual disk knife 11 mounted on a standard 12 and driven in a well known manner from a handwheel 13. The usual reciprocating meat table is shown at 14 on which material 15 to be sliced is held by means of a clamp 16. The table 14 is reciprocated on ways 17 and 18 by means of a crank 19 and a connecting rod or pitman 20, the pitman 20 being connected to the crank 19 by a wrist pin 21 and with the reciprocating table 14 by a pivot pin 22. When the hand-wheel 13 is rotated, the reciprocating table 14 moves back and forth past the cutting edge of the knife 11, cutting slices from the forward surface of the material 15 in the usual manner, the material being fed forward during the return movement of the table by a ratchet wheel 23 and associated mechanism, many forms of which are well known.

Projecting outwardly from the front face of the base frame 10 is a bracket 25 which carries an upright standard 26 on which a slice receiving table 27 is mounted for oscillation, the upper edge of the receiving table being approximately on a level with or slightly below the upper surface of the meat table 14. The edge 28 of the slice receiving table 27 is in the form of an arc struck from the axis of the upright 26, the radius of the arc being of such length, as shown in Fig. 2, that the edge of the table lies adjacent the front edge of the reciprocating table 14 at a point just in front of the knife 11. The table 27 is provided with a downwardly projecting rim 29 against which a flexible band 30 bears for oscillating the table 27 about its pivotal support. The band 30 is connected to the slice receiving table at 31 and to the reciprocating meat table at 32, so that the movement of the meat table toward the knife rotates the slice receiving table about its axis, causing the adjacent edges of the two tables to move in unison with one another. During the return movement of the reciprocating table 14, the oscillatory table 27 is returned to its original position by a coil spring 33 surrounding the upright 26 and having one end attached to the table 27. Carried by the upper surface of the table 27 is an upright plate 36 which may be provided with a supplementary bearing 37 upon the standard 26. The plate 36 carries a plurality of guide sockets 38 in which pins 39 are mounted to slide horizontally. The pins 39 are connected at their ends to a curved guard plate 40 the lower edge of which rests upon the upper surface of the table 27. The guard plate 40 is preferably given a somewhat greater curvature than that of the periphery of the table 27 for a purpose which will be explained.

A series of tines 41 extends outwardly from the outer surface of the upright plate 36, the outer ends of the tines terminating along the curved surface corresponding to the curvature of the periphery of the table 27. The guard plate is provided with a series of openings through which the tines 41 extend. As the table 27 is rotated in unison with the forward movement of the meat table 14, it is apparent that the tines 41 will successively enter the cut surface of the meat 15 to a depth approximately equal to the thickness of the slice being cut, and the slice as it is severed will thus be supported upon the points of the tines 41.

A guard plate 42, shown best in Fig. 4, is supported by a bracket 43 from the frame of the machine and is shaped to conform to the curvature of the periphery of the slicing knife 11 and lies adjacent the portion of the knife which severs the slices. A series of grooves 44 is provided in the plate 42 which gradually increase in depth as they recede from the cutting edge of the slicing knife. These grooves are arranged to receive the points of the tines 41, and it is apparent that a slice of meat held on the tine points will be pushed backwardly by the plate 42 as the tines move in grooves 44, thus insuring a secure support for the slices upon the tines. The plate 42 is provided with a series of backwardly extending projections 45 which register with notches 46 in a detached extension 47 for the plate 42. The extension guard plate 47 is provided with a series of grooves 48 registering with the grooves 44 for accommodating the points of the tines 41. The grooves 48 are of sufficient depth, however, to permit a slight lateral movement of the plate 47 without causing the plate to strike the ends of the tines 41. The plate 47 has a pair of brackets 50 secured to its rear surface, as shown in Figs. 2, 6 and 7. The brackets 50 have arcuate slots 51 therein which receive supporting rollers 52 carried on arms 53 secured to an upright standard 54. The standard 54 is mounted on a slide bar 55 held by guide loops 56 fastened to the bracket 25. The slots 51 and rollers 52 permit lateral movement of the guard plate 47 in the direction of its curvature, but this movement is limited by a pair of springs 57 which connect the standard 54 with eyes 58 in the rear surface of the plate 47. The slide bar 55 permits movement of the plate 47 in a direction transverse to the face of the plate and a coil spring 59 tends normally to draw the plate 47 away from the axis 26 of the slice collector, the spring 59 being secured to the bracket 25 at the point 60 and to the slide bar 55 by means of a pin 61. A roller 62 is attached to the slide bar 55 and is engaged by one end of a lever 63 pivoted at 64 on the bracket 25. The opposite end of the lever 63 extends into the path of movement of a roller 65 mounted on the end of a curved arm or extension 66 connected with the pitman rod 20. It will be apparent from Fig. 3 of the drawings, that the roller 65 engages the lever 63 at the time in the operation of the machine when the material 15 has passed the slicing knife 11 and the slice, that has just been formed, has been brought into contact with the concave surface of the guard plate 47. In this position the table 14 is practically stationary but the pitman 20 is receiving its maximum rotation about the pivot 22. This rotation of the pitman 20 about the pivot 22 will force the roller 65 into engagement with the lever 63 and cause the lever to move the slide bar 55 toward the pivotal axis 26 of the slice receiver and thus will cause the guard plate 47 to press the slice just formed together with the slices previously formed along the tines 41 toward the upright plate 36. The slices will in this way be forced upon the tines an amount sufficient to insure them against any accidental displacement and to leave the points of the tines extending through the slices a sufficient distance to engage the next slice to be cut. During this movement of the plate 47, the slice collector will move but slightly about the pivot 26 since the movement of the plates takes place at the time when the reciprocation of the table 14 is at a minimum. The plate 47, however, is free to move with the rotation of the collector about the pivot 26 during the time that the plate is being pressed against the surface of the last slice, because of the arrangement of the slots 51 and rollers 52 and any displacement of the plate in this manner will be restored by the springs 57 after the pressure of the plate upon the slices has been removed. The inner engaging portions 45 and 46 of the plates 42 and 47 permits of movement of the plate 47 without breaking the continuity of the two guard plates. As the slices are forced backwardly along the tines 41, the guard plate 40 will be moved ahead of the slices and will be retained in its various positions by the friction between the plate and the tines 41 and between the bars 39 and their bearings 38. As will be seen from Fig. 2, the outermost tines 41 penetrate the slices more obliquely than do the centrally positioned tines, and for this reason each slice presents a greater thickness to the outermost tines than it does to the central tines. The outermost tines will therefore be filled more rapidly than will the central tines and for this reason, as previously suggested, the plate 40 may be given a greater curvature than that of the periphery 28 of the table 27, thus providing on the outermost tines a greater space for the accommodation of the slices than is required on the central tines. It is apparent that when the desired number of slices has been collected at any time, they may be removed from the tines 41 for sliding the plate outwardly, thus pushing the slices from the ends of the tines.

It will be apparent from Fig. 2 that the tines, at the left of the pivotal support 26, enter the meat at an oblique angle and are pressed into the meat by movement somewhat out of line with the direction of the tine. In order to overcome this mode of operation it may be desirable in some cases to construct the collector in the manner shown in Figs. 8 and 9 in which the collector table 70 is arranged entirely on the side of the pivotal support 71 away from the slicing knife 11. With this arrangement the first tine 41 enters the meat at right angles to the surface and the subsequent tines are forced into the meat in the direction in which they are being moved by the rotation of the table 70. In other respects this construction is similar to that previously described.

In the arrangement shown in Fig. 10, the outermost tines 41 are curved outwardly at their ends and the tines of the succeeding rows progressing toward the pivotal support 26 are each curved in the same direction as those of the outermost row, but the degree of curvature lessens until the tines in the row which is in alinement with the axis are reached, which tines remain straight. This curvature is for the purpose of compensating for the fact that the slices are moved inwardly more rapidly on the outermost tines than they are on the radial tines, and this more rapid movement increases the angularity of the slices relative to the tines and hence changes the distance from one tine to another measured along a given slice. This condition tends to stretch the slices to some extent when the tines are all parallel, as shown in Fig. 3. When the tines are curved, however, in the manner indicated in Fig. 10, the curvature of each tine toward the next adjacent tine will compensate for the increased angularity of the slices between the tines so that the length of slice necessary to reach from one tine to another remains constant. Where this construction is used elongated openings 75 must be provided in the plate 40 to permit sliding movement of the plate upon the tines.

I claim:

1. In a slicing machine, a slice collector comprising a plurality of elongated tines, and means for causing said tines to penetrate and retain a plurality of slices formed by said machine, said tines being of sufficient length to penetrate the entire stack of slices thus collected.

2. The combination with a slicing machine, of a slice collector therefor having a plurality of elongated tines, means for holding said tines against movement in the direction of their length, and means for causing said tines to successively penetrate the slices as they are formed by said machine and to retain a plurality of slices thus engaged.

3. The combination with a slicing machine, of a slice collector therefor having a plurality of elongated tines, and means for moving said tines in unison with the movement of said slicing machine and for holding said tines against movement in the direction of the length thereof to cause said tines to penetrate the successive slices as they are formed by said machine while the slices previously formed are retained on said tines.

4. A slice collector comprising a plurality of elongated tines having their pointed ends lying in a curved surface, said tines being spaced from one another but arranged to extend in substantially the same direction.

5. A slice collector comprising a rotary member having a plurality of elongated tines thereon arranged with their points spaced in a curved surface about the periphery of said collector and with the body portions of the tines extending substantially parallel with one another.

6. A slice collector, comprising a rotary slice support, a plurality of elongated tines carried by said support and having their points arranged to lie in a surface having the axis of rotation of said support as the axis of curvature of said surface but with the body portions of some of said tines directed toward one side of said axis.

7. A slice collector comprising a plurality of elongated tines, a guard plate mounted to slide upon said tines, and means for causing a plurality of slices to be impaled by said tines in front of said guard plate.

8. A slicing machine comprising a rotary slice collector, a plurality of elongated tines carried by said collector and having their points arranged to lie in an arcuate surface, and a guard plate mounted to move along said tines in the direction of the length thereof.

9. In combination, a slicing machine, a slice collector comprising a plurality of elongated tines for receiving slices formed by said machine, means for causing the points of said tines to penetrate a slice as it is formed, and supplemental means for forcing said slice backwardly upon said tines.

10. In combination, a slicing machine, a rotary slice collector having a plurality of elongated tines thereon, means for rotating said collector in unison with the movement of said machine for causing the points of said tines to engage a slice as it is formed by said machine, and supplemental mechanism for forcing said slice an additional distance upon said tines after the slice has been severed.

11. In combination, a slicing machine, a slice collector having a plurality of tines for engaging a slice as it is formed by said machine, a guard plate positioned adjacent the path of movement of said slice, and means for moving said guard plate to cause said plate to force said slice onto said tines.

12. In combination, a slicing machine having a reciprocating table, a slice collector arranged to move in unison with said table, mechanism for adjusting the slices on said collector, and means for operating said adjusting mechanism during the period of minimum movement of said reciprocating table.

13. In combination, a slicing machine, a slice collector arranged to reciprocate relative to said machine to receive slices as they are formed, and means for adjusting the slices relative to said collector while said collector is adjacent one extremity of its path of movement.

14. The combination with a slicing machine, of a collector for receiving slices from said machine, means for imparting a reciprocatory movement to said collector, and means supported independently of said collector but having a slight movement in unison therewith for engaging the slices on said collector to cause an adjustment thereof.

15. The combination with a slicing machine, of a collector for receiving slices from said machine, a guard plate positioned adjacent the path of movement of said collector and arranged to engage the slices supported upon said collector, mechanism for imparting movement to said guard plate during a period of minimum movement of said collector for adjusting the slices on said collector, and supporting means for said guard plate arranged to permit a slight movement of said plate in unison with said collector.

16. In combination, a slicing machine having a reciprocating table, a crank arm and pitman for operating said table, means for collecting slices formed by said machine, and means operated by said pitman for adjusting the slices on said collecting means.

17. In combination, a slicing machine, a slice collector having tines for engaging slices formed by said machine, a guard plate having grooves therein for receiving the points of said tines, and a supplemental guard plate having interfitting engagement with said first mentioned guard plate and movable relative thereto, said supplemental guard plate having grooves therein also for receiving said tines.

18. In combination, a slicing machine and means for collecting slices formed by said machine comprising a support arranged to rotate about an upright axis, elongated tines carried by said support and arranged in a horizontal direction, means for rotating said support to cause the points of said tines to successively engage the slices as they are formed, and means for forcing said slices along said tines to cause a plurality of slices to be collected thereon.

19. A collector for slices comprising a plurality of elongated tines having their points arranged to lie in an arcuate surface, and means for causing a plurality of slices to be impaled by said tines, said tines being deflected away from one another, the amount of deflection of said tines varying according to the position of the tines upon the collector.

20. A slice collector comprising a plurality of elongated tines arranged in spaced relation to one another, and having their points arranged to lie in an arcuate surface and substantially forming cords of said surface but having their end portions bent to vary the spacing of the points relative to one another.

21. A slice collector comprising elongated tines for receiving a plurality of slices, and means for supporting said tines adjacent said slices.

22. A slice collector comprising elongated tines for receiving slices, and means for bracing said tines intermediate the ends thereof.

23. A slice collector comprising elongated tines for impaling and retaining a plurality of slices, and a movable support for engaging said tines adjacent said slices to assist in sustaining the weight of said slices.

24. A slice collector comprising horizontally extending elongated tines for impaling and retaining a plurality of slices, and a support for said tines having openings therein through which said tines pass, said support being movable relative to said tines to permit said support to be maintained in a position adjacent said slices to brace said tines and help sustain the weight of said slices.

In testimony whereof I have signed my name to this specification on this 26th day of September, A. D. 1917.

CORNELIS F. M. van BERKEL.

Witnesses:
K. HONKAMP,
HERBERT H. JONES.